United States Patent [19]

Melone

[11] Patent Number: 5,707,107
[45] Date of Patent: Jan. 13, 1998

[54] VEHICLE SEAT BACK COVERS

[76] Inventor: Francis Melone, 7 Bellaire Dr., Huntington, N.Y. 11743

[21] Appl. No.: 741,385

[22] Filed: Oct. 29, 1996

[51] Int. Cl.$^6$ ............................................. A47C 31/00
[52] U.S. Cl. ................ 297/228.1; 297/229; 297/228.11; 297/284.4
[58] Field of Search .......................... 297/218.4, 228.1, 297/219.1, 219.12, 220, 224, 228.11, 228.12, 229, 284.4, 284.5

[56] References Cited

U.S. PATENT DOCUMENTS

| | | | |
|---|---|---|---|
| 1,304,753 | 5/1919 | Dwyer | 297/228.11 X |
| 4,694,511 | 9/1987 | Estes et al. | 297/229 X |
| 4,772,070 | 9/1988 | Leto, Jr. et al. | 297/228.12 |
| 5,005,901 | 4/1991 | Hinde | 297/229 |
| 5,234,252 | 8/1993 | Wallach | 297/228.1 X |
| 5,265,933 | 11/1993 | Croshaw | 297/228.1 |
| 5,533,787 | 7/1996 | Xiang | 297/228.11 X |

Primary Examiner—Laurie K. Cranmer
Attorney, Agent, or Firm—Kuhn and Muller

[57] ABSTRACT

A cover for the seat back and head rest of a motor vehicle having bucket seats is designed with the look and feel of a typical hooded sweatshirt. Features such as a "hood", "hand warmer" type pockets and a stretchable waistband enhance the illusion. The cover uses typical sweatshirt materials which have a variety of desirable characteristics. For example, a cotton facing with cotton fleece lining is hypo allergenic and has the desirable combination of stretch and absorbency. The cover also provides a venue for the display of popular logos, such as sports team names or college names in an automobile. The cover is easy to remove and install. Moreover, a "hand warmer" pocket is provided in the lumbar region in the seat back front, which may be stuffed with soft material to enchance comfort and lumbar support. Other pockets may be provided on a back side for maps or other items which may be conveniently stored within.

6 Claims, 2 Drawing Sheets

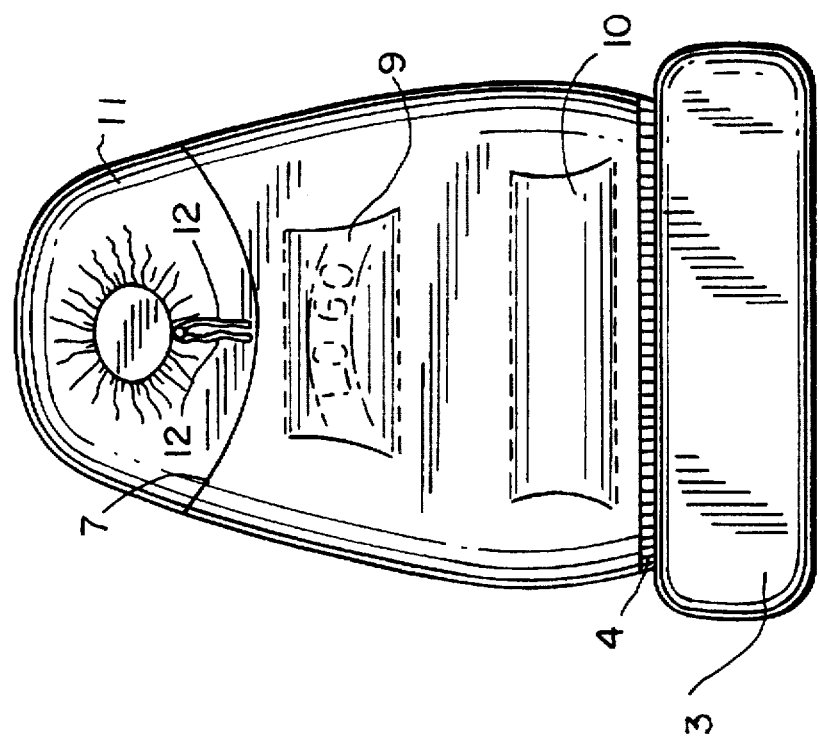
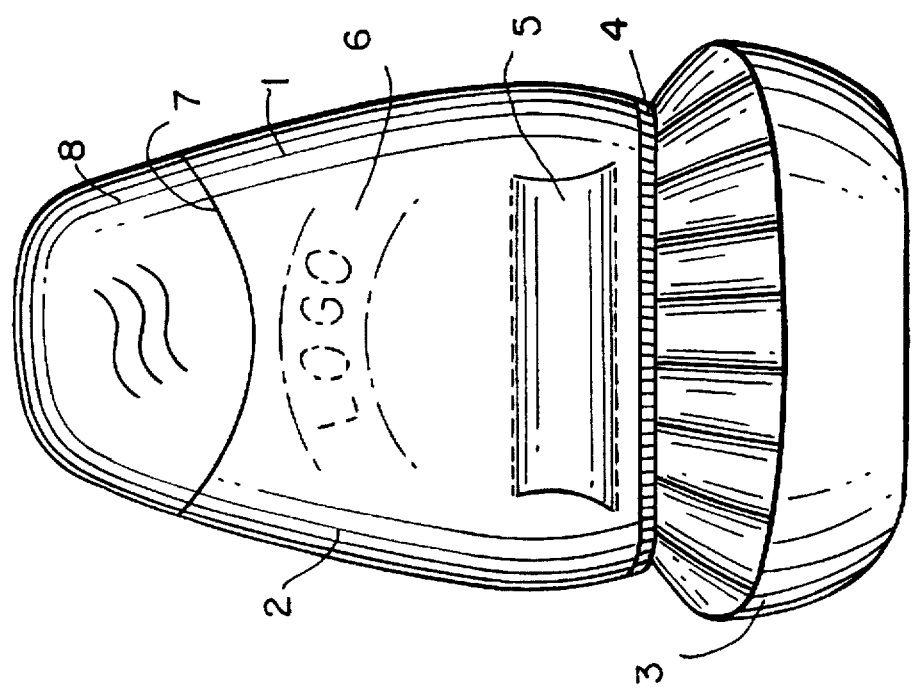

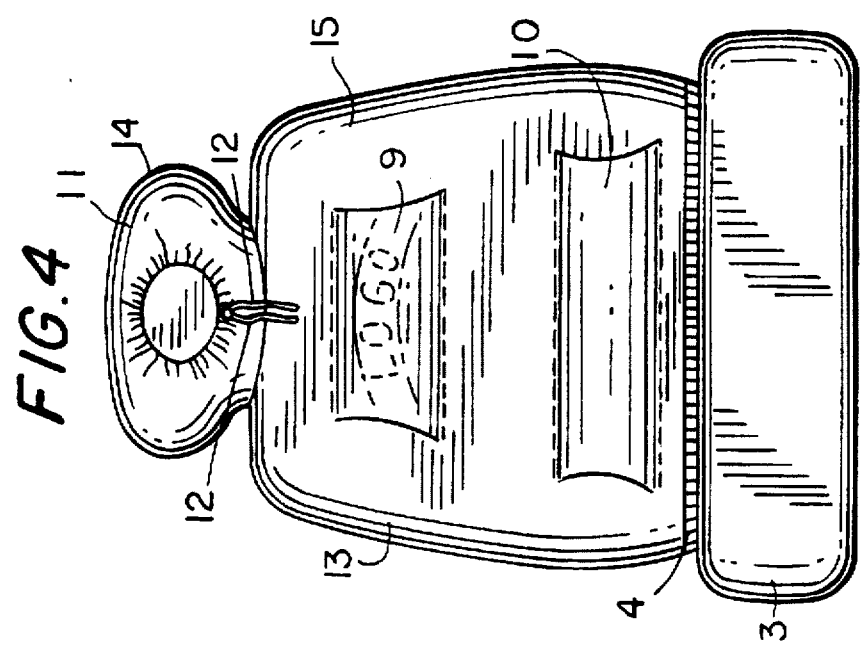
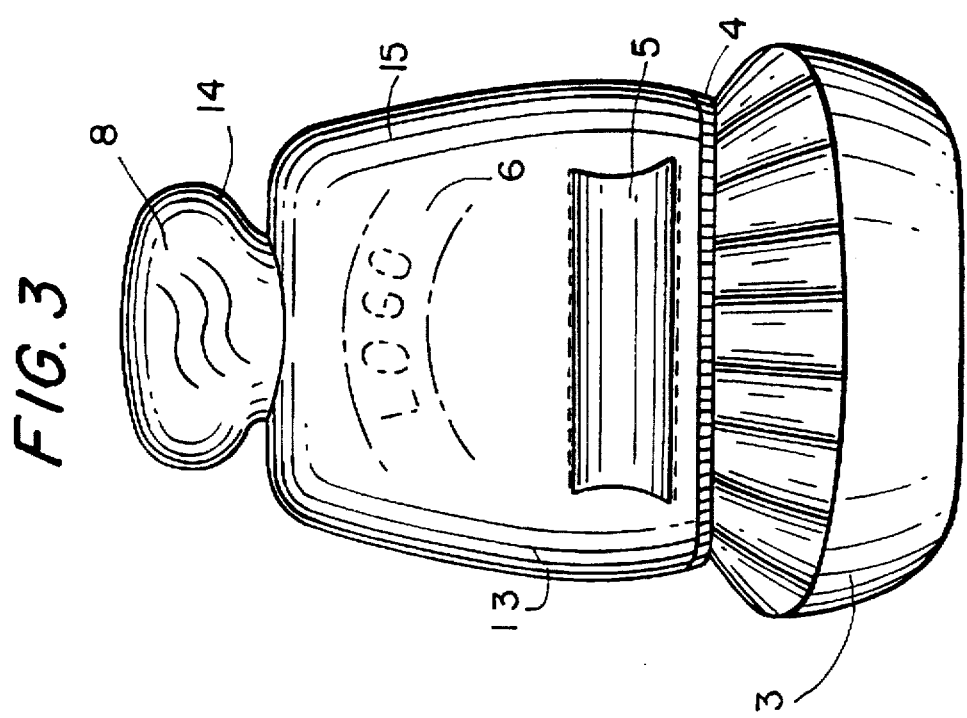

VEHICLE SEAT BACK COVERS

FIELD OF THE INVENTION

The present invention relates to a cover for the seat back of motor vehicles having bucket seats. It is designed with the look and feel of a typical hooded sweatshirt.

BACKGROUND OF THE INVENTION

The prior art reveals a variety of seat covers for motor vehicles. U.S. Pat. No. 3,220,768 of Bird reveals a cover for a vehicle bench seat with attachment clips and a feature for reversing the seat cushion cover for use on the seat back. U.S. Pat. No. 5,005,901 of Hinde discloses a removable seat cover with an integral pocket for storage of same. U.S. Pat. No. 5,112,104 of De Giacomi shows a cover for the seat cushion and seat back of a vehicle bucket seat having the appearance of an animal. U.S. Pat. No. 5,265,933 of Croshaw teaches the use of a continuous loop seat cover fastening system. U.S. Pat. No. 5,403,066 of Drum relates to a vehicle seat cover incorporating reversible terrycloth with integral foam layers within.

Clearly, none of the cited prior art patents relates to the present invention.

OBJECTS OF THE INVENTION

An object of the present invention is to provide inexpensive covers for the seat backs of high-back, low-back, and modified bucket seats.

A further object is to present the cover in a familiar form reminiscent of a hooded sweatshirt. Features such as a "hood", "hand warmer" type pockets and a stretchable waistband enhance the illusion.

Another object of this invention is to use typical sweatshirt materials which have a variety of desirable characteristics. For example, a cotton facing with cotton fleece lining is hypo allergenic and has the desirable combination of stretch and absorbency.

Yet another object of this invention is to provide a venue for the display of popular logos, such as sports team names or college names, in an automobile.

Another object is to provide seat back covers that are easy to remove and install.

Another object is to provide a "hand warmer" pocket in the lumbar region in the seat back front. This may be stuffed with soft material to enhance comfort.

Yet another object is to provide two "hand warmer" pockets on the back side for maps or other items which may be conveniently stored within.

SUMMARY OF THE INVENTION

In keeping with these objects and others which may become apparent, the novel seat back covers of the present invention fit vehicle bucket seat backs.

It includes a simulated sweat, shirt of stretchable yet comfortable seat cover material which fits over the seat back and head rest of a bucket seat having a seat back, a headrest and a seat cushion. A top section, separated by seam represents the "hood" portion. An elastic waistband portion anchors the seat back cover at the bottom. The "hand warmer" pocket portion in the lumbar region may be just used decoratively, or it may be stuffed with foam or other soft and/or resilient material to provide more low back comfort on long trips.

The material of the seat cover is preferably a sweat shirt type of material, such as cotton fleece. While other fleece-type polyester and/or polyester-cotton blend materials may be used, cotton fleece is preferable, since it stretches like a SPANDEX® type material but it is sweat absorbent and moisture permeable, unlike many synthetic stretchable materials. Moreover, while terrycloth towel material is also absorbent and soft, terrycloth does not stretch as well as sweatshirt-type cotton fleece material.

BRIEF DESCRIPTION OF THE DRAWINGS

The present invention can best be understood in conjunction with the accompanying drawings, in which:

FIG. 1 is a front elevational view of the seat back cover on high-back bucket seat;

FIG. 2 is a rear elevational view of the seat back cover on a high-back bucket seat as in FIG. 1;

FIG. 3 is a front elevational view of another embodiment for a seat back cover on a low-back bucket seat; and FIG. 4 is a rear elevational view of the seat back cover on a low-back bucket seat, as in FIG. 3.

DETAILED DESCRIPTION

As shown in FIGS. 1–4, the novelty seat back covers of the present invention are cut and sewn to fit two or three major styles of vehicle bucket seat backs. Styles for the two extreme types, the high-back and the low-back design are illustrated in the drawing FIGS. 1–4. A "modified" type of seat having a taller narrower back than the low-back but still with a separate headrest would require a different pattern for a perfect fit, but one of the two styles illustrated may accommodate this type of seat back due to the stretch of the material and the informal nature of the application.

FIG. 1 shows a front view of the typical high-back style of bucket seat having a high narrow seat back 2 with integral headrest and seat cushion 3. The seat back cover 1 is a body of material with an indicia, such as a silk-screened, printed or applied logo 6 representative of a particular school, club, team or organization. The top section 8, adjacent to seat back cover 1, is separated by seam 7 and represents the "hood" portion. Top section 8 also has space for further decoration as illustrated. The elastic waistband 4 helps keep the seat back cover anchored at the bottom.

The "hand warmer" pocket 5 in the lumbar region may be just used decoratively, or it may be stuffed with foam or other soft and/or resilient material, such as a lumbar support member, to provide more comfort on long trips.

FIG. 2 shows the back side of the same type of bucket seat. The top portion above seam 7 has a puckered or "gathered" appearance 11 due to the drawstrings 12 within tangential sleeves along an edge of top seam 8, being pulled together to further simulate a hood. Two more "hand warmer" pockets 9 and 10 are shown on the back. These may be used as convenient storage pockets. The top pocket area 9 is an ideal place for a logo.

FIGS. 3 and 4 show corresponding views of a seat back cover installed on a low-back bucket seat. The seat back 13 is quite wider and shorter and has a separate headrest 14. Seat back cover 15 is similarly proportioned to accommodate the differences in the seat back dimensions as compared to those of the high-back bucket seat illustrated in FIGS. 1 and 2. The features of this seat back cover 15 are similar to those of cover 1 described in the preceding paragraph. The top portion of seat back cover 15 is even more reminiscent of a hood due to the necked-in area around seam 7; this is due to the use of a separate headrest.

It is known that other modifications may be made to the present invention, without departing from the scope of the present invention, as noted in the appended claims.

I claim:

1. A cover for, and in combination with, a bucket seat having a seat back and head rest of a motor vehicle comprising:

a body of material simulating the look and feel of a typical hooded sweatshirt, said body of material insertable over said seat back of said bucket seat, said body of material having a hood portion enclosing said head rest of the bucket seat, said hood portion separated from said body of material by a first gathering means, said body of material having a further gathering means at a lower end thereof for tightening said body of material about the back seat;

pocket means mounted on said body of material in the lumbar region of the user comprising a horizontally extended pocket open at both ends for stuffing soft and/or resilient material as desired; and said first gathering means comprising a draw string in the middle of the back side of said hood portion for gathering said material about said head rest.

2. The cover for a seat back and head rest of a bucket seat of a motor vehicle as in claim 1, wherein said further gathering means comprises a stretchable waistband.

3. The cover for a seat back and head rest of a bucket seat of a motor vehicle as in claim 1, wherein said body of material and said hood portion comprise a cotton fleece material.

4. The cover for a seat back and head rest of a bucket seat of a motor vehicle as in claim 1, wherein said body of material and said hood portion comprise a cotton polyester blend.

5. The cover for a seat back and head rest of a bucket seat of a motor vehicle as in claim 1, wherein said body of material and said hood portion comprise a polyester.

6. The cover for a seat back and head rest of a bucket seat of a motor vehicle as in claim 1, wherein said cover includes an indicia imprinted thereon.

* * * * *